United States Patent
Weinert et al.

(10) Patent No.: US 6,240,233 B1
(45) Date of Patent: May 29, 2001

(54) INTEGRATED OPTICAL BEAM SPREAD TRANSFORMER

(75) Inventors: Carl Michael Weinert; Helmut Heidrich, both of Berlin (DE)

(73) Assignee: Heinrich Hertz Institut fuer Nachrichtentechnik Berlin GmbH, Berlin (DE)

(*) Notice: Subject to any disclaimer, the term of this patent is extended or adjusted under 35 U.S.C. 154(b) by 0 days.

(21) Appl. No.: 09/155,191
(22) PCT Filed: Mar. 27, 1997
(86) PCT No.: PCT/DE97/00698
 § 371 Date: Sep. 22, 1998
 § 102(e) Date: Sep. 22, 1998
(87) PCT Pub. No.: WO97/37255
 PCT Pub. Date: Oct. 9, 1997

(30) Foreign Application Priority Data

Mar. 29, 1996 (DE) ................................. 196 13 701

(51) Int. Cl.$^7$ ................. G02B 6/14; G02B 6/30
(52) U.S. Cl. ................. 385/131; 385/28; 385/43; 385/49; 385/50
(58) Field of Search ................. 385/27, 28, 31, 385/39, 43, 49, 50, 129–132

(56) References Cited

U.S. PATENT DOCUMENTS

| | | | |
|---|---|---|---|
| 4,159,452 | * 6/1979 | Logan et al. | 385/131 X |
| 5,278,926 | * 1/1994 | Doussiere | 385/28 |
| 5,657,338 | * 8/1997 | Kitamura | 385/131 X |
| 5,985,685 | * 11/1999 | Lealman et al. | 385/49 X |
| 6,030,540 | * 2/2000 | Yamamoto et al. | 385/132 X |

OTHER PUBLICATIONS

Mörl et al, "Uncladded InGaAsP/InP rib waveguides with integrated thickness tapers for efficient fibre–chip butt coupling", Electronics Letters, vol. 32, No. 1, Jan. 4, 1996, pp. 36–38.*

Albrecht et al, "Polarization Independent Integrated Mode Transformer For Uncladded InGaAsP/InP Rib Waveguides Without Epitaxial Regrowth", 22nd European Conference on Optical Communication (ECOC '96), Oslo Norway, Sep. 1996, paper TuC3.3, 4 pages.*

Zengerle et al, "Low–Loss Fibre–Chip Coupling By Buried Laterally Tapered InP/InGaAsP Waveguide Structure", Electronics Letters, vol. 28, No. 7, Mar. 26, 1992, pp. 631–632.*

Wenger et al, "Design and Fabrication of Monolithic Optical Spot Size Transformers (MOST's) for Highly Efficient Fiber–Chip Coupling", Journal of Lightwave Technology, vol. 12, No. 10, Oct. 1994, pp. 1782–1790.*

* cited by examiner

Primary Examiner—John D. Lee
(74) Attorney, Agent, or Firm—Karl Hormann

(57) ABSTRACT

In an integrated structure of a beam spread transformer with several buffer layers separated from each other by light guiding layers there is provided on the upper buffer layer an unclad rib waveguide with a tapered section. Between the fiber-facing interface and the tapered section there is provided a section over which the rib is extending. There, the waveguiding layer is completely removed and the exposed buffer layer is reduced symmetrically to a width which is greater than the width of the rib. By the additional rib thus formed coupling independent of polarization is made possible. The coupling is optimized by increasing layer thicknesses of the buffer layers.

9 Claims, 4 Drawing Sheets

INTEGRATED OPTICAL BEAM SPREAD TRANSFORMER

BACKGROUND OF THE INVENTION

Field of the Invention

The invention relates to an integrated optical field width or beam spread transformer structured of several buffer layers on a substrate, the buffer layers being separated from each other by conductive layers, and an unclad rib wave guide of a constant rib width arranged on the upper buffer layer and having a tapered section at the interface between chip and fiber.

In integrated optics, cross-section changes occur when light guides are connected. The propagating light waves have to be subjected either to a widening or to a compacting change of field width in order to avoid abrupt transitions. In addition, the shape of the propagation images has to be matched when coupling photonic switching circuits to light waveguides. In integrated light waveguides these propagation images are of narrow lying elliptical shape and in fibers they are of rotationally symmetric shape. The elliptical shape cannot be avoided in unclad rib waveguides; but the propagating image in the waveguide may be enlarged by widening the field, so that losses from matching the fibre are low.

A number of publications has dealt with problems of optical waveguide couplings and with the coupling of waveguides to fibers. By way of example, German patent specifications DE 41 03 896 C1 and DE 41 42 850 A1 may be mentioned, see in particular FIGS. 3 through 5 and the associated description thereof. The state of the art upon which the invention is based, is known from "Proceedings 21st European Conference on Optical Communication ECOC '95, Brussels, Belgium, Paper TU P22, 1995, "Uncladded thickness tapers with InGaAsP/InP rib waveguides for efficient fibre-chip butt coupling", Mörl et al. This beam spread transformer satisfies requirements as regards a low loss of 1 dB in mode matching as well as a cost-efficient fabrication. Because of the tapered section of the rib waveguide there occurs a shift of the propagation image in a vertical direction and a change in the beam spread in horizontal and vertical directions. This resulted in an optimization in respect of the TE polarization. The coupling loss between chip and fiber amounts to 2 dB as regards the TE component, but is higher by several dB for the TM component.

OBJECT OF THE INVENTION

The technical problem with which the invention is concerned is to achieve independence of polarization of the beam spread transformer in addition to the advantages already achieved.

BRIEF SUMMARY OF THE INVENTION

To this end and in accordance with the invention, there is provided in a beam spread transformer of the kind referred to above a section extending from the fiber interface to the tapered section in which the rib extends to the fiber interface and the waveguide layer of the rib waveguide is totally removed and in which the exposed buffer layer is reduced in symmetry to the continuous rib to a width w2 which is greater than the width $w_1$ of the rib.

Thus, the beam spread transformer in accordance with the invention functions independently of the direction of light propagation and, therefore, constitutes a bi-directional optical component for couplings between chips and fibers. The formed section which is new relative to the state of the art is provided with an additional rib which will hereafter be referred to as TM focussing rib. It is formed by removing, following the removal of the waveguide layer directly below the rib, marginal portions of the buffer layer exposed on both sides of the continuous rib in symmetry thereto down to the waveguide layer therebelow. The TM focussing rib also leads to optimum matching of the propagation image to the rotationally symmetric shape of the fiber in respect of the TM component. The arrangement is thus independent of polarization while maintaining low mode matching losses. It has been shown that the waveguide remains monomodal over the entire beam spread transformer and that possible radiation losses are without noticeable effect. The additional fabrication effort relative to the state of the art upon which the invention is based is limited to a single additional structuring step and has a negligible effect on fabrication costs.

It is of its own inventive significance, also with respect to its cooperation with the inventive structuring of the section in which the width of the exposed buffer layer is reduced, to structure the tapered section as a ramp having a continuously changing incline in its longitudinal direction as well as a smooth transition into the exposed buffer layer. In this manner, the length of this section may be limited to an absolutely necessary extent and, more particularly, an improvement is achieved in the shift of the propagation image in the vertical direction.

In the context of the invention and its embodiments, it is of essential significance that the height of the buffer layers increases in the direction of the substrate. In such an embodiment the spacing between the waveguide layers between the buffer layers below the TM focussing rib increases and an optimum propagation is assured in respect of the TE as well as of the TM component.

Embodiments of the invention will hereafter be described in more detail with reference to the schematic drawings, in which:

BRIEF DESCRIPTION OF THE SEVERAL DRAWINGS

DETAILED DESCRIPTION OF PREFERRED EMBODIMENTS

Figure 1:
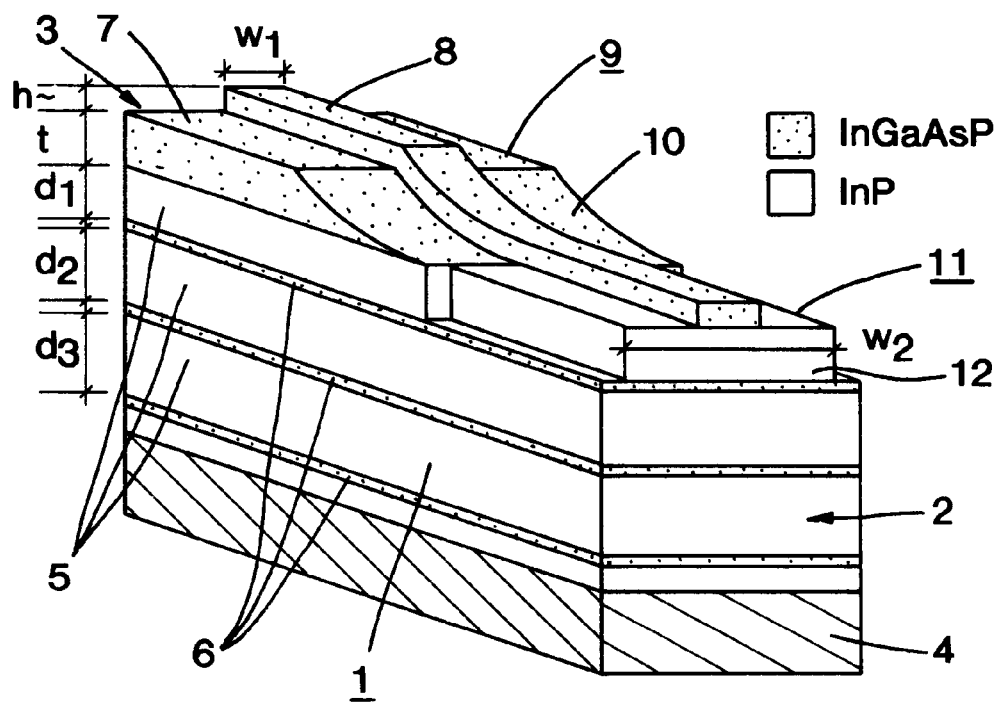
FIG. 1 is a perspective presentation of the beam spread transformer in accordance with the invention.

The beam spread or field width transformer 1 (hereinafter FWT) shown in FIG. 1 is provided with an interface 2 facing a fiber and an interface 3 facing a chip. It consists of a sequentially arranged plurality of buffer layers 5 built up on a substrate 4 and separated by waveguide layers 6. For technological reasons, the layer intermediate the substrate 4 and the lower waveguide layer 6 consists of a material which is at least similar to the buffer layers 5. In the direction of the substrate 4 the buffer layers 5 are of increasing layer thicknesses $d_1$, $d_2$, $d_3$. Hence, the spacing between the waveguide layers 6 is similarly increasing.

A waveguide layer 7 and a continuous rib 8 of width $w_1$ and height h are provided on the upper buffer layer 5. The buffer layers 5 consist of InP, all waveguide layers 6, 7 and the rib 8 consist of InGaAsP. The waveguide layer 7 and the continuous rib 8 are one piece structures.

In the longitudinal direction the FWT 1 has three sections. In a section adjacent to the chip-facing interface 3 the structure of the FWT 1 is identical to the chip to which it is to be coupled or to which it has been coupled. A tapered section 9 is positioned in the middle section where the thickness t of the waveguide layer 7 varies and is structured as a ramp 10 having a continuously changing incline in its longitudinal direction as well as a smooth transition in the direction of the exposed buffer layer 5. The steepest incline of the ramp in section 9 is located on the side facing the chip-facing interface 3. Within the tapered section 9 the continuous rib 8 conforms to the contour of the parabolic ramp 10. In a third section between the tapered section 9 and the fiber-facing interface 2 the waveguide layer 7 is removed completely. In this section, the upper buffer layer 5 is exposed save for its surface covered by the continuous rib 8 and is reduced in its width $w_2$ in symmetry to the continuous rib 8. The remainder of the upper buffer layer 5 forms an additional short rib 12 named TM focussing rib. The dimensions in respect of width $w_1$ and height h of the continuous rib 8 are constant in all three sections.

Figure 2:
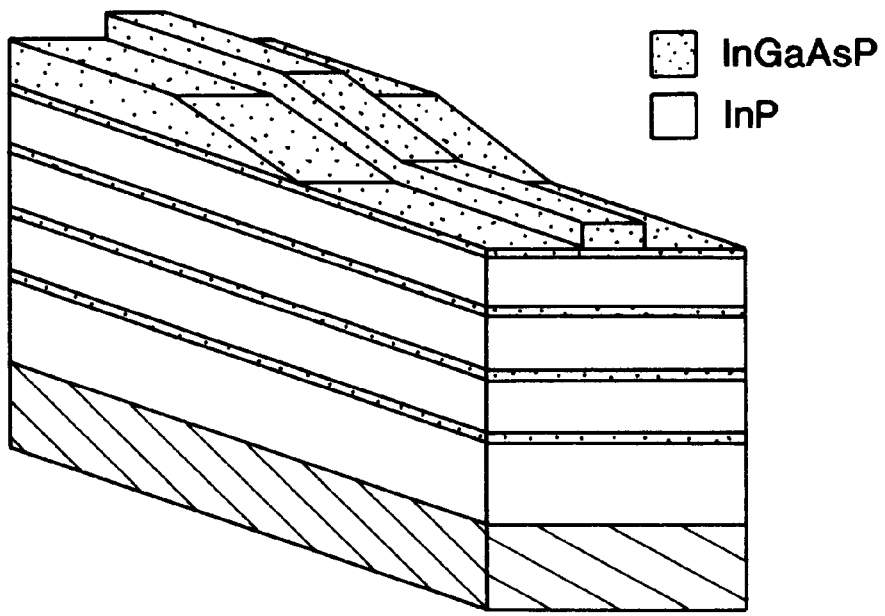
FIG. 2 is a perspective presentation of a beam spread transformer according to the state of the art upon which the invention is based.

The differences between the FWT in accordance with the invention and the state of the art are rendered apparent by FIG. 2. The known FWT is provided with two sections only. One is adjacent to the fiber-facing interface and is shaped as a tapered section with a planar inclined ramp; the other section is positioned adjacent to the chip-facing interface. No section with the TM focussing rib essential to the invention is either mentioned or indicated. While the structure of the known FWT does consist of a plurality of buffer layers separated from each other by waveguide layers, all of these buffer layers are of identical height.

Figure 3:
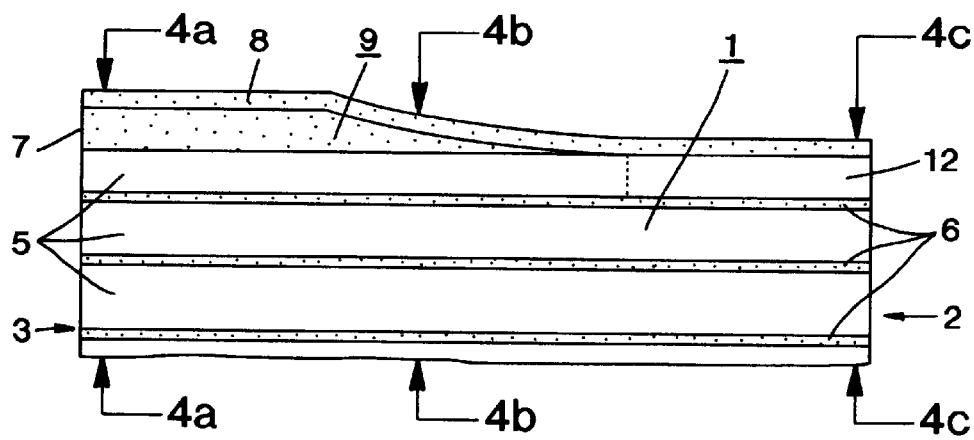
FIG. 3 is a longitudinal section through the beam spread transformer of FIG. 1.
Figure 4A:
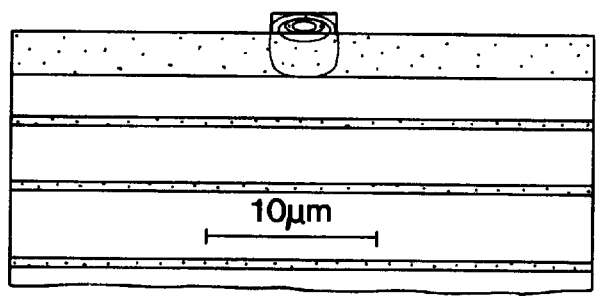
FIG. 4 depicts three field distribution images for the positions marked in the longitudinal section of FIG. 3.
Figure 4B:
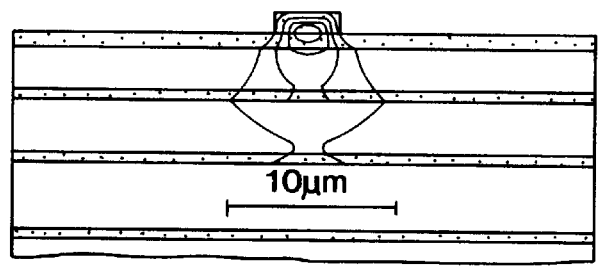
Figure 4C:
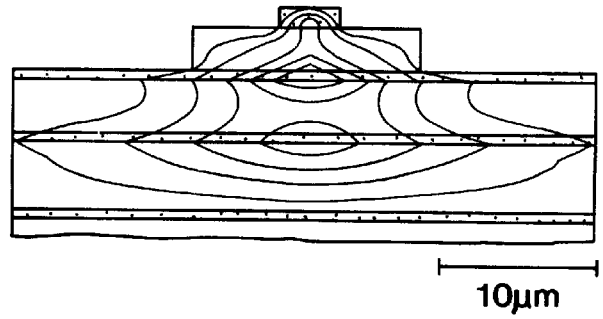

FIG. 3 is closely related to the images of FIG. 4. The central longitudinal section according to FIG. 3 depicts the continuous rib 8 extending over the entire length of the FWT 1 between its fiber-facing and chip-facing interfaces 2 and 3, respectively, the waveguide layer 7 tapered in the middle section, as well as the alternating buffer layers 5 and waveguide layers 6. In the middle longitudinal section the rear margin of the TM focussing rib 12 is indicated by a broken line.

The field distributions as depicted in FIG. 4 relate to the planes of the fiber-facing and to the chip-facing interfaces 2 and 3, respectively, as well as to the middle of the tapered section 9. At the chip-facing interface 3, the light wave is substantially guided at a small field width within the waveguide layer 7 beneath the continuous rib 8. The field distribution depicted for the tapered region 9 displays a vertical and a horizontal widening as well as a vertical shift of the centroid of the field distribution. At the fiber-facing interface 2 the lightwave propagates a large field width. This field distribution ensures coupling of the light wave independent of its polarization.

Figure 5:
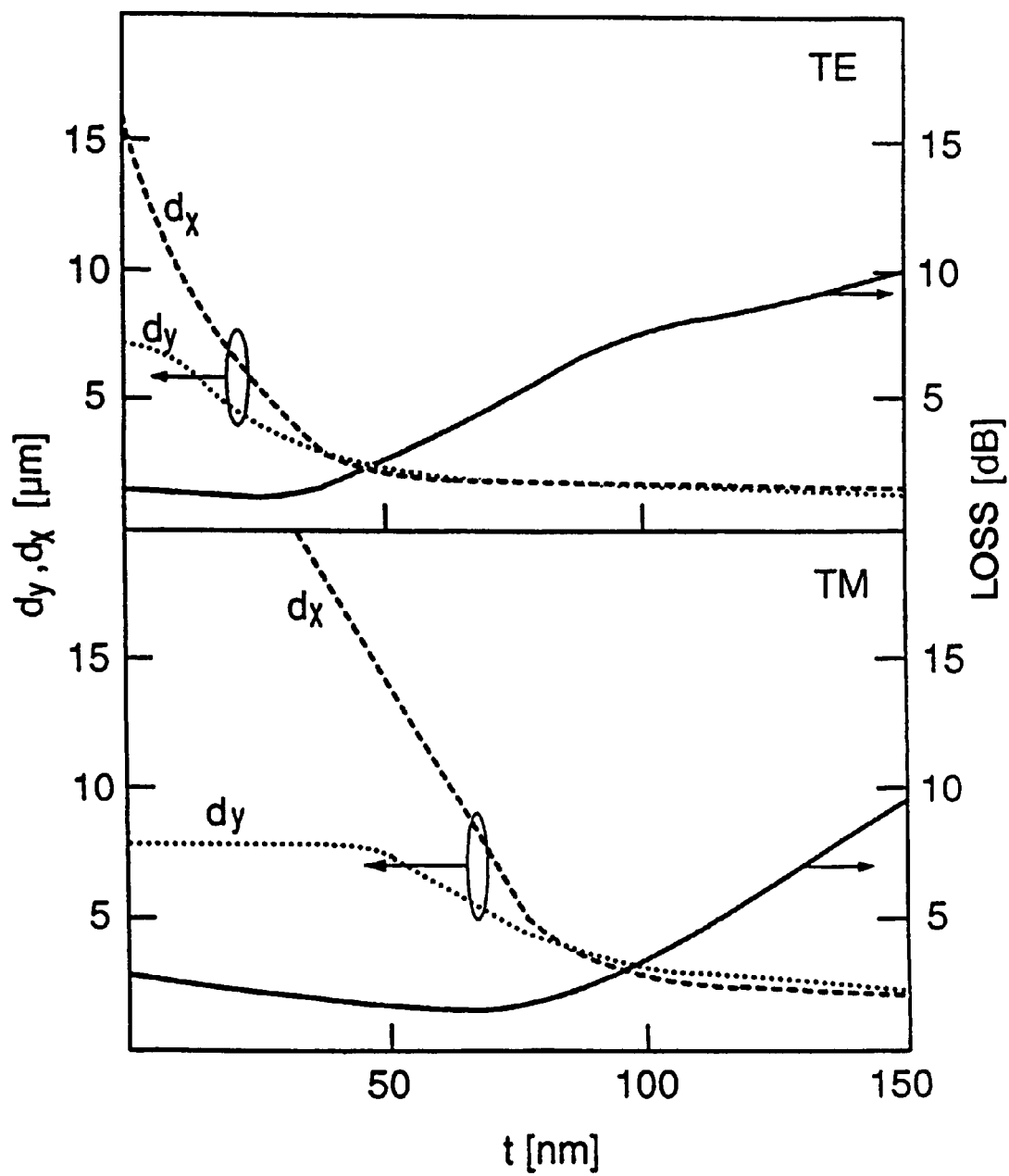
FIG. 5 is a diagram of the path of the coupling loss and the dimensions of the light spot for the TE and the TM component in the tapered section.
Figure 6:
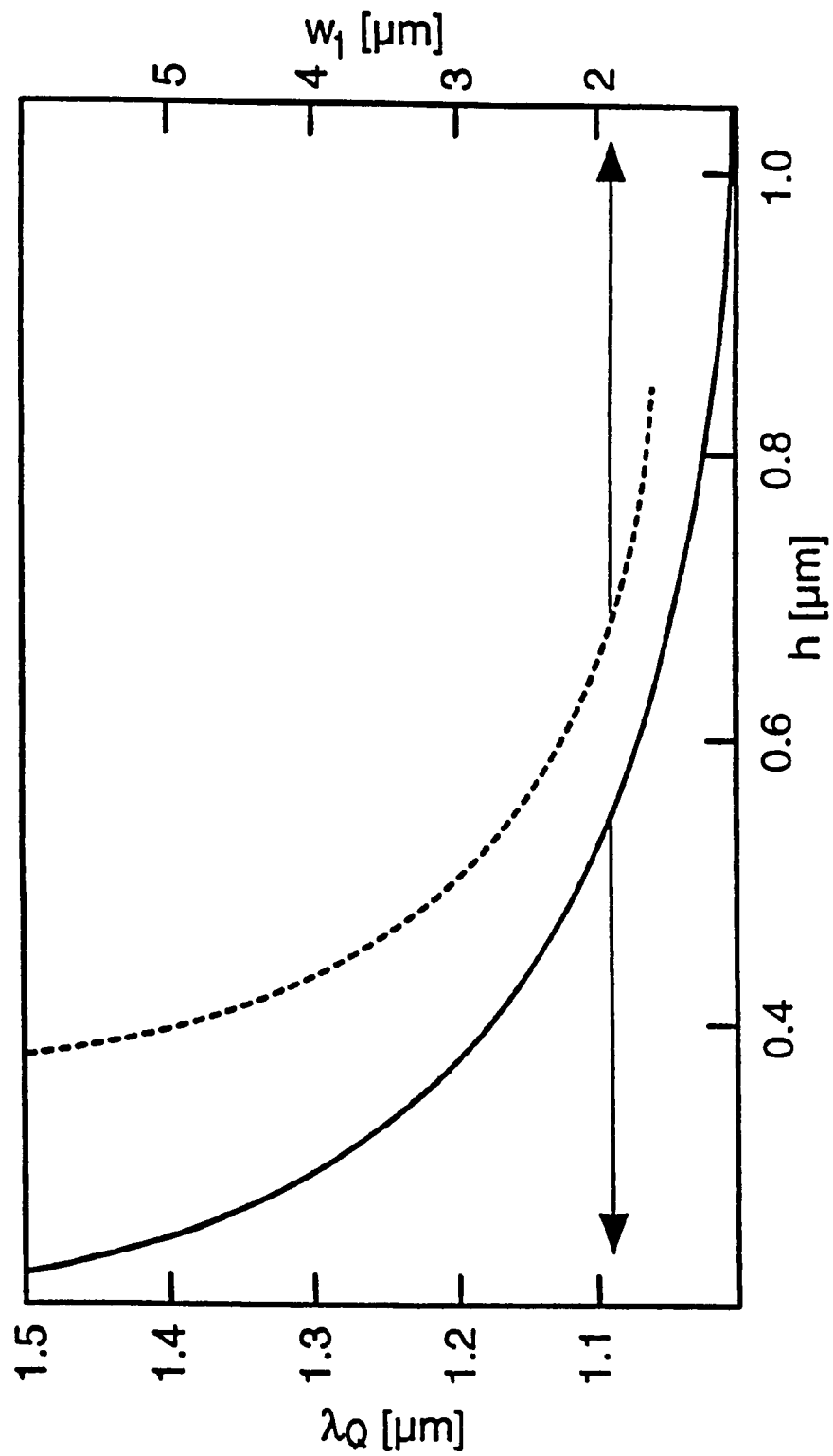
FIG. 6 is diagram for defining the essential parameters of the continuous rib.

The diagrams shown in FIGS. 5 and 6 are used to size the continuous rib 8 of the FWT's in accordance with the invention which are provided with an addition focussing rib 12. The diagram of FIG. 5 is based upon a quaternary material for wavelength $\lambda_Q=1.06$ $\mu$m. The upper portion of this diagram relates to the TE component, the nether portion relates to the TM component. The buffer layers are based upon thicknesses of $d_1=0.7$ $\mu$m, $d_2=1.85$ $\mu$m, $d_3=3.15$ $\mu$m (see $d_1$, $d_2$, $d_3$ in FIG. 1).

Each of the horizontal -$d_x$- and vertical -$d_y$- diameters of the beam spot and the loss as a result of mismatched modes are stated as functions of the thickness t in nm of the waveguide layer 7. At small layer thicknesses $d_y$ approaches constant values which are predetermined by the position of the waveguide layers 6. By contrast, $d_x$ increases significantly without showing any cut-off because the waveguide 7, 8 is shaped laterally symmetrically. This is contrasted by the minimum values for losses resulting from mode relative to the TE and TM components at different thicknesses t. The loss curves for TE and TM components intersect at 35 nm and at that point their mode matching loss is about 2 dB.

Instead of making use of the interface of the TE and TM loss curves at t=35 nm, each of the two polarizations is treated differently and independently of one another. Initially, the vertical tapering leads to a loss for the TE polarized wave of 1.7 dB, yet of 3.2 dB for the TM polarized wave, since the size of the beam spot is too large for the TM component. The additional rib 12 reduces the size of the beam spot for the TM component and for that reason it is named TM focussing rib. The result is a total mode matching loss of 1.1 dB and is identical for the TE and TM polarization.

As regards the fabrication of FWT's 1 in accordance with the invention, it is to be noted that the vertical etching of the tapering contour has to satisfy low tolerance requirements to yield the precise thickness at which the taper is independent of polarization. At the end of the taper, the quaternary layer is removed completely down to the InP layer beneath it. The InP layer acts as a detector layer for the removal. As long as the waveguide layers 6 and the TM focussing rib 12 remain unchanged the same polarization-independent values may be obtained with the embodiment of the invention for continuous ribs 8 of different widths $w_1$ and different material compositions. At a 1 dB mode matching loss, the interrelationship between material composition and height h of the continuous rib 8 having a width $w_1$ of 2 $\mu$m is apparent from the solid line curve in FIG. 6. The dashed line also indicates the width $w_1$ of the continuous rib 8 as the changing parameter.

The following are exemplary dimensional data:
Materials: GaInAsP/InP
Quarternary Layer: $\lambda_Q=1.06$ $\mu$m
Rib 8: $w_1=2.2$ $\mu$m, h=0.6 $\mu$m
Rib 12: $w_2=10$ $\mu$m, $d_1=0.7$ $\mu$m
Waveguide Layers 6: 0.1 $\mu$m thick
Buffer Layers: $d_1=0.7$ $\mu$m, $d_2=1.85$ $\mu$m, $d_3=3.15$ $\mu$m
Taper Ramp: Structure with continuously changing incline

What is claimed is:
1. An integrated optical field width transformer for connecting an optical fiber to an optical chip, comprising:
    a substrate;
    a plurality of buffer layers stacked on the substrate;
    a plurality of waveguide layers for separating the buffer layers from each other;
    means disposed at a predetermined angle relative to the substrate and forming a first interface for connecting an optical fiber to the transformer;
    means disposed substantially opposite to the first interface and at a predetermined angle relative to the substrate and forming a second interface for connecting an optical chip to the transformer;

a substantially unclad rib including a waveguide layer disposed on the upper buffer layer extending between the first and second interfaces and provided with a first section tapering from a first thickness to a second thickness, the rib having a second section extending at a substantially constant height and width from one of the first and second interfaces to the first section across the buffer layer, the buffer layer on either side of the second section of the rib being wider than the rib and being exposed between the first section and the one of the first and second interfaces.

2. The transformer of claim 1, wherein the one interface is the interface for connecting a fiber.

3. The transformer of claim 1, wherein the first section tapers in the direction from the interface for connecting a chip.

4. The transformer of claim 3, wherein the first section tapers at a continuously changing incline.

5. The transformer of claim 1, wherein the thickness of the buffer layers increases in the direction of the substrate.

6. The transformer of claim 5, wherein the plurality of buffer layers is three and wherein the layers are of thicknesses $d_1=0.7$ µm, $d_2=1.85$ µm and $d_3=3.15$ µm.

7. The transformer of claim 1, wherein the waveguide layers comprise a quaternary material for wavelength $\lambda=1.06$ µm.

8. The transformer of claim 7, wherein the quaternary material comprises GaInAsP.

9. The transformer of claim 1, wherein the buffer layers comprise InP.

* * * * *